United States Patent
Sugawara et al.

(10) Patent No.: US 10,418,184 B2
(45) Date of Patent: Sep. 17, 2019

(54) SOLID ELECTROLYTIC CAPACITOR

(71) Applicant: NEC Tokin Corporation, Sendai-shi (JP)

(72) Inventors: Yasuhisa Sugawara, Miyagi (JP); Yuji Murayama, Sendai (JP); Hiroyuki Demizu, Sendai (JP); Hiroki Satoh, Sendai (JP)

(73) Assignee: Tokin Corporation, Sendai-shi, Miyagi (JP)

( * ) Notice: Subject to any disclaimer, the term of this patent is extended or adjusted under 35 U.S.C. 154(b) by 0 days.

(21) Appl. No.: 15/085,791

(22) Filed: Mar. 30, 2016

(65) Prior Publication Data

US 2016/0293337 A1     Oct. 6, 2016

(30) Foreign Application Priority Data

Apr. 2, 2015  (JP) .................. 2015-075989

(51) Int. Cl.
| | |
|---|---|
| H01G 9/028 | (2006.01) |
| H01G 9/15 | (2006.01) |
| H01G 9/00 | (2006.01) |
| H01G 9/052 | (2006.01) |

(52) U.S. Cl.
CPC .......... H01G 9/028 (2013.01); H01G 9/0036 (2013.01); H01G 9/052 (2013.01); H01G 9/15 (2013.01)

(58) Field of Classification Search
CPC ........ H01G 9/025; H01G 9/028; H01G 9/042; H01G 9/035; H01G 9/15; H01G 9/022; H01G 9/038
See application file for complete search history.

(56) References Cited

U.S. PATENT DOCUMENTS

| | | | | |
|---|---|---|---|---|
| 2004/0033414 A1* | 2/2004 | Rohrl | .................... | C07C 211/62 204/431 |
| 2008/0076026 A1* | 3/2008 | Ryu | .................. | H01M 10/0565 429/189 |
| 2008/0209876 A1* | 9/2008 | Miller | ................ | G11C 13/0009 55/522 |
| 2012/0229955 A1* | 9/2012 | Biler | .................... | H01G 9/0036 361/529 |
| 2012/0321963 A1* | 12/2012 | Fujioka | ............. | H01M 10/0565 429/303 |
| 2013/0214196 A1* | 8/2013 | Milliken | .............. | H01G 9/2004 252/62.2 |
| 2013/0229750 A1* | 9/2013 | Nobuta | ................ | H01G 9/0036 361/525 |
| 2014/0182680 A1* | 7/2014 | Kawata | ................... | C07F 5/027 136/263 |

FOREIGN PATENT DOCUMENTS

| | | |
|---|---|---|
| JP | 2001-196271 | 7/2001 |
| JP | 2014-045115 | 3/2014 |

* cited by examiner

*Primary Examiner* — Nguyen T Ha
(74) *Attorney, Agent, or Firm* — Knobbe, Martens, Olson & Bear, LLP

(57) ABSTRACT

The solid electrolytic capacitor according to the present invention is a solid electrolytic capacitor including a valve metal, an oxide film layer formed on a surface of the valve metal, and a solid electrolyte layer formed on the oxide film layer, wherein the solid electrolyte layer contains a conductive polymer and a gel of an organic solvent solidified with a chemical gelling agent.

9 Claims, 1 Drawing Sheet

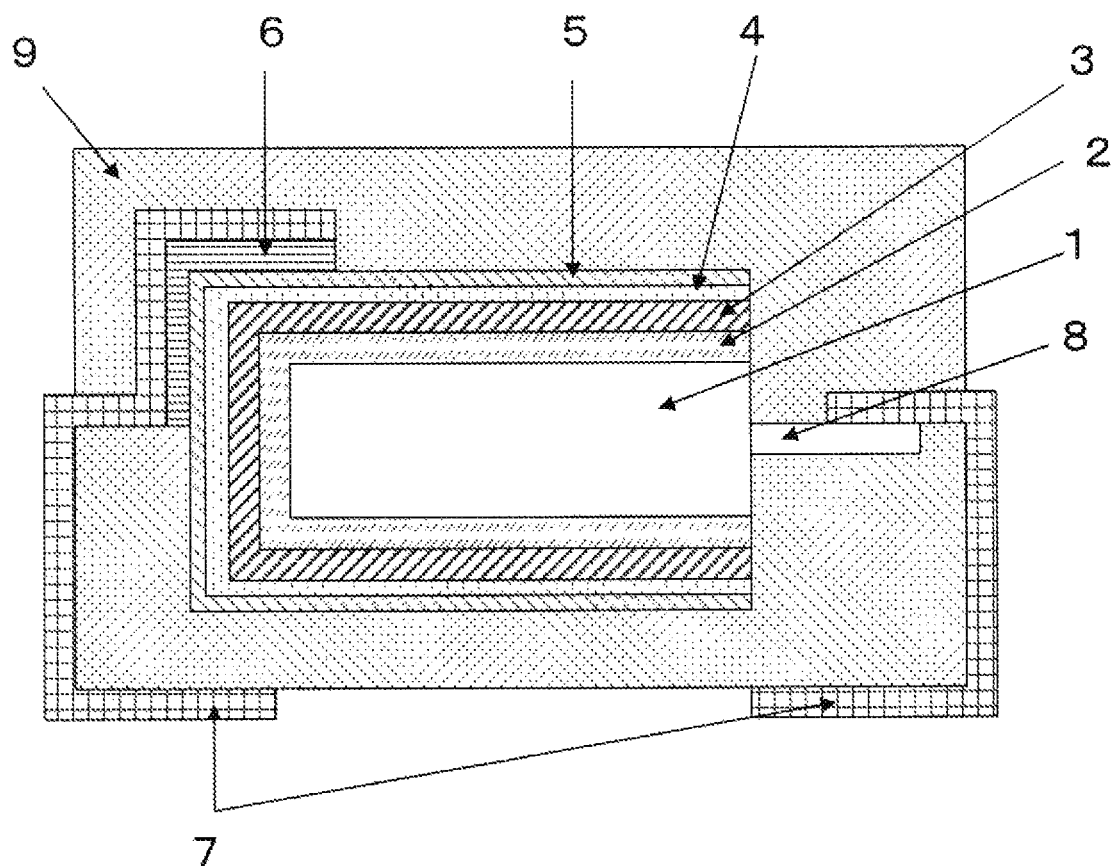

SOLID ELECTROLYTIC CAPACITOR

BACKGROUND OF THE INVENTION

Field of the Invention

The present invention relates to a solid electrolytic capacitor including a conductive polymer material as solid electrolyte. The present invention more specifically relates to a solid electrolytic capacitor having a reduced leakage current and well sustaining the effect of the reduced leakage current even after long-term use of the capacitor at high temperatures.

Description of the Related Art

Typical electrolytic capacitors including an electrolyte solution as electrolyte can repair defects generated in dielectric oxide films during production of the capacitors. For this reason, the leakage current is not significantly increased. In contrast, solid electrolytic capacitors including a solid electrolyte as electrolyte cannot repair the dielectric oxide film because the electrolytes are solids. Thus, solid electrolytic capacitors cannot self-repair defects generated in the dielectric oxide film. Accordingly, if the dielectric oxide films are degraded by mechanical stress or thermal stress during production, the solid electrolytic capacitors tend to have significantly increased a leakage current. The solid electrolytic capacitors in the related art have been aged to reduce the leakage current due to the solid electrolytes. In this aging treatment, the dielectric oxide films are repaired with the moisture content absorbed from the atmosphere. The aging treatment depends on the moisture absorbing properties of the device.

For this problem, JP2001-196271A (D1) proposes a solid electrolytic capacitor including a capacitor element including a valve metal, an oxide film layer formed on the surface of the valve metal, and a solid electrolyte layer formed on the oxide film layer, and an exterior accommodating the capacitor element, wherein the capacitor element contains an organic compound having a boiling point of 150° C. or more and a melting point of 150° C. or less. In D1, the organic compound has a boiling point of more preferably 200° C. or more, particularly preferably 250° C. or more.

JP2014-045115A (D2) proposes a solid electrolytic capacitor including a solid electrolyte layer and an oxide film repairing layer composed of a gelated layer retaining moisture. The oxide film repairing layer can function as follows: If a leakage current (LC) flows into defects of a dielectric layer, the LC reaches the oxide film repairing layer and electrically decomposes water retained in the oxide film repairing layer to generate oxygen. The generated oxygen is fed to the valve metal corresponding to the defects to form a stable oxide film.

Unfortunately, the leakage current is still large in the configuration of D1. After long-term use of the solid electrolytic capacitor at high temperatures, it is difficult to completely prevent volatilization of the organic compound used even if the organic compound has a high boiling point. As a result, the effect of repairing the oxide film reduces with a reduction in the organic compound, and an increase in LC cannot be prevented.

In D2, although the oxide film repairing layer composed of a gelled layer retaining water is a solidified gel, water gradually volatilizes under high temperatures to reduce the ability to repair the oxide film. In other words, the durability at high temperatures of the solid electrolytic capacitor still has room for improvement. Moreover, the configuration of the oxide film repairing layer disposed between the oxide film and the solid electrolyte layer readily increases equivalent series resistance (ESR).

SUMMARY OF THE INVENTION

To solve the problems above, an object of the present invention is to provide a solid electrolytic capacitor having a reduced leakage current (LC) and maintaining the effect of repairing an oxide film even after long-term use of the capacitor under high temperatures.

One aspect of the present invention is a solid electrolytic capacitor including a valve metal, an oxide film layer formed on a surface of the valve metal, and a solid electrolyte layer formed on the oxide film layer, wherein the solid electrolyte layer includes a conductive polymer and a gel of an organic solvent solidified with a chemical gelling agent.

The gel has a melting point of preferably 160° C. or more, more preferably 180° C. or more. The melting point is particularly preferably 260° C. or more.

The solid electrolyte layer is preferably a solid electrolyte layer including a conductive polymer layer and a gel of an organic solvent, that is formed by forming the conductive polymer layer on the oxide film layer, and then impregnating the conductive polymer layer with the organic solvent containing a chemical gelling agent to gel the organic solvent; or a solid electrolyte layer formed by gelling a conductive polymer solution containing the conductive polymer, the chemical gelling agent, and the organic solvent.

The gel preferably includes a gel electrolyte formed by solidifying an electrolyte solution containing the organic solvent and also an electrolyte. The solid electrolyte layer containing the gel electrolyte is preferably a solid electrolyte layer formed by forming a conductive polymer layer on an oxide film layer, and then impregnating the conductive polymer layer with the electrolyte solution containing the chemical gelling agent to gel the electrolyte solution; or a solid electrolyte layer formed by gelling a polymer solution containing the conductive polymer, the chemical gelling agent, the organic solvent, and an electrolyte.

In addition, the valve metal is preferably selected from at least one selected from aluminum, tantalum, niobium, tungsten, titanium, and zirconium or at least one of alloys of the valve metals.

In one embodiment according to the present invention, the organic solvent is maintained as a solidified gel; hence, volatilization of the organic solvent is prevented even after long-term use of the capacitor at high temperatures, enabling the capacitor to retain the effect of repairing an oxide film for a long time.

BRIEF DESCRIPTION OF THE DRAWING

FIG. 1 is a schematic sectional view illustrating an outline of the solid electrolytic capacitor according to one embodiment of the present invention.

DETAILED DESCRIPTION OF THE PREFERRED EMBODIMENTS

Hereinafter, the solid electrolytic capacitor according to one embodiment of the present invention will be described in detail.

The solid electrolytic capacitor according to the present embodiment is a solid electrolytic capacitor including a valve metal, an oxide film layer formed on a surface of the valve metal, and a solid electrolyte layer formed on the oxide film layer as components, wherein the solid electrolyte layer contains both a conductive polymer and a gel of an organic solvent solidified with a chemical gelling agent.

(Gel and Gel Electrolyte)

The gel according to the present embodiment is prepared by solidifying an organic solvent with a chemical gelling agent. The gel electrolyte is prepared by solidifying an electrolyte solution, which is prepared by dissolving an electrolyte in an organic solvent, with a chemical gelling agent. The gel and the gel electrolyte are collectively referred to as "gel" unless otherwise specified. Solidification reduces the volatility to continue the ability to repair the oxide film even after long-term use of the capacitor under high temperatures.

The gel prepared with a chemical gelling agent spreads into micropore portions in the element of the solid electrolytic capacitor in the form of a liquid; then, the gel can be solidified. The gel needs to be present near the oxide film to repair the oxide film. Accordingly, a high effect of repairing the oxide film can be attained through impregnation of such a liquid form.

The gel prepared with a chemical gelling agent is a chemical gel having a gel skeleton composed of a substance having a network structure formed through covalent bond. Such a network structure is barely broken by application of heat. For this reason, such a chemical gel has a melting point higher than that of the physical gel having a network structure formed through a weak interaction such as an intermolecular force.

The gel preferably has a melting point of 160° C. or more. Heat resistance at 150° C. is required in regions requiring high heat resistance such as those in vehicles. At a melting point of less than 160° C., the solvent gradually volatilizes during long-term use under such an environment to decrease the ability to repair the oxide film. The melting point of the gel can be determined by differential scanning calorimetry (DSC).

The gel more preferably has a melting point of 180° C. or more. The capacitor element is temporarily exposed to a high temperature of about 180° C. during formation of the resin for the exterior of the solid electrolytic capacitor. A gel having a melting point of less than 180° C. may not sufficiently prevent the volatilization of the solvent, resulting in defective products due to expansion of the solid electrolytic capacitor during this step.

The gel particularly preferably has a melting point of 260° C. or more. The capacitor element is temporarily exposed to a high temperature of about 260° C. during the reflow soldering step in mounting of the solid electrolytic capacitor. A gel having a melting point of less than 260° C. may not sufficiently prevent the volatilization of the solvent, resulting in defective products due to expansion of the solid electrolytic capacitor during this step. Use of lead-free soldering has been required, leading to exposure of the capacitor element to a temperature higher than that in the conventional reflow soldering step.

<Organic Solvent>

The organic solvent used in this embodiment is preferably selected from protic polar solvents and aprotic polar solvents. Examples thereof include, but should not be limited to:

Alcohol solvents such as ethyleneglycol, propyleneglycol, grycerol and digrycerol;

ether solvents such as ethyleneglycol monomethyl ether, ethyleneglycol monoethyl ether, ethyleneglycol monobutyl ether, ethyleneglycol monophenyl ether, tetrahydrofuran, 3-methyltetrahydrofuran, ethyleneglycol dimethyl ether, ethyleneglycol diethyl ether, diethyleneglycol monomethyl ether, diethyleneglycol monoethyl ether, diethyleneglycol dimethyl ether, diethyleneglycol diethyl ether and polyethylene glycol;

amide solvents such as N-methylformamide, N-ethylformamide, N,N-dimethylformamide, N,N-diethylformamide, N-methylacetamide, N-ethylacetamide, N,N-dimethylacetamide, N,N-diethylacetamide, N,N-dimethylpropionamide, N-methylpyrrolidone and N-ethylpyrrolidone;

lactone solvents such as γ-butyrolactone, β-butyrolactone, γ-valerolactone, δ-valerolactone and α-acetyl-γ-butyrolactone;

carbonate solvents such as ethylene carbonate, propylene carbonate, dimethyl carbonate and diethyl carbonate;

nitrile solvents such as acetonitrile, propionitrile, butyronitrile, acrylonitrile, methacrylonitrile, benzonitrile and 3-methoxy propionitrile;

carbamate solvents such as N-methyl-2-oxazolidone;

urea solvents such as N, N'-dimethyl imidazolidinone; and sulfone solvents such as sulfolane, 3-methyl sulfolane and dimethyl sulfone.

Among these organic solvents, preferred are ethylene glycol, propylene glycol, glycerol, diglycerol, ethylene glycol monophenyl ether, diethylene glycol monomethyl ether, diethylene glycol monoethyl ether, diethylene glycol diethyl ether, polyethylene glycol, N-methylformamide, N-ethylformamide, N-methylacetamide, N,N-diethylacetamide, N-methylpyrrolidone, N-ethylpyrrolidone, γ-butyrolactone, γ-valerolactone, δ-valerolactone, α-acetyl-γ-butyrolactone, ethylene carbonate, propylene carbonate, benzonitrile, N,N'-dimethylimidazolidinone, sulfolane, and dimethylsulfone, which have boiling points of more than 180° C. and have significantly low volatility after solidification of these organic solvents with the chemical gelling agent.

Among these organic solvents, particularly preferred are ethylene glycol, propylene glycol, glycerol, diglycerol, diethylene glycol monomethyl ether, diethylene glycol monoethyl ether, diethylene glycol diethyl ether, N-methyl pyrrolidone, γ-butyrolactone, γ-valerolactone, δ-valerolactone, propylene carbonate, and benzonitrile, which remain liquid at temperatures below zero. Although it is stated that glycerol has a melting point of 17.8° C. under atmospheric pressure, glycerol does not solidify at a temperature of 17.8° C. or less, for example, below zero unless any seed crystals are contained or a step of cooling glycerol to about −75° C., and gradually raising the temperature is performed.

These organic solvents may be used singly or in the form of a mixed solvent of two or more organic solvents miscible with each other. In the electrolyte solution, a mixed solvent of an organic solvent and water may be used as the electrolyte solution solvent to enhance the ability to repair the oxide film. In this case, the content of water in the gel to be formed is preferably 5% by mass or less to prevent volatilization of the solvent under environments at high temperatures. Water entrained with the organic solvent can be removed to some extent before or during gelation.

<Electrolyte>

In addition to the organic solvent, salts of ammoniums including quaternary ammoniums with inorganic acids and organic acids; salts of amines with inorganic acids and organic acids; and salts of quaternary phosphoniums with inorganic acids and organic acids can be used as the electrolyte for the electrolyte solution.

Here, examples of the inorganic acids include boric acid, carbonic acid, silicic acid, phosphoric acid, phosphonic acid, hypophosphoric acid, nitric acid, sulfuric acid, sulfurous acid, thiocyanic acid, cyanic acid, fluoroboric acid, hexafluorophosphoric acid, hexafluoroarsenic acid, hexafluoroantimonic acid and perchloric acid.

Examples of the organic acids include formic acid, acetic acid, oxalic acid, malonic acid, succinic acid, glutaric acid, adipic acid, pimelic acid, suberic acid, azelaic acid, sebacic acid, undecanoic diacid, dodecanoic diacid, brassylic acid, tetradecanedioic acid, pentadecanoic acid, dimethyl malonate, diethyl malonate, dipropyl malonate, 3,3-dimethyl glutaric acid, 3-methyl adipic acid, 1,6-decane dicarboxylic acid, 1,2-cyclohexanedicarboxylic acid, maleic acid, citraconic acid, benzoic acid, phthalic acid, trimellitic acid, pyromellitic acid, salicylic acid, γ-resorcinol acid, p-nitrobenzoic acid, phenol, picric acid, methanesulfonic acid, benzenesulfonic acid and trifluoromethanesulfonic acid.

The inorganic acids and organic acids can be partially esterified.

Examples of the mines include methylamine, ethylamine, propylamine, butylamine, ethylenediamine, monoethanolamine, dimethylamine, diethylamine, dipropylamine, ethylmethylamine, diphenylamine, diethanolamine, trimethylamine, triethylamine, tributylamine, 1,8-diazabicyclo(5.4.0)-undecene-7 and triethanolamine.

Examples of the ammoniums include diethyl ammonium, triethyl ammonium, tripropyl ammonium, ethanol ammonium, diethanol ammonium, triethanol ammonium, cyclohexyl ammonium, piperidinium, 1,5-diazabicyclo(4.3.0)nonenium-5, 1,8-diazabicyclo(5.4.0)undesenium-7, tetramethyl ammonium, methyl triethyl ammonium, dimethyl diethyl ammonium, trimethyl ethyl ammonium, tetraethyl ammonium, tetrabutyl ammonium, N,N-dimethylpyrrolidinium, N-methyl-N-ethylpyrrolidinium, N,N-dimethylpiperidinium, benzyl trimethyl ammonium, N-ethylpyridinium and N,N'-dimethylimidazolium.

Examples of the quaternary phosphoniums include tetramethyl phosphonium, methyl triethyl phosphonium, tetraethyl phosphonium, tetrapropyl phosphonium and tetrabutyl phosphonium.

These electrolytes may be used singly or in combinations of two or more. More preferably, the electrolyte contains boric acid or boric acid ester to give flame retardancy.

The gel electrolyte prepared through gelation of the electrolyte solution, which is prepared by dissolving an electrolyte in the organic solvent, with the chemical gelling agent has the ability to repair the oxide film higher than that of the gel of the organic solvent solidified with the chemical gelling agent, and can more significantly reduce LC.

<Chemical Gelling Agent>

Examples of the chemical gelling agent used in the present embodiment include combinations of monomers or oligomers having one or more polymerizable functional groups per molecule and polymerization initiators, and combinations of polymers having two or more functional groups serving as staring points of crosslinking and crosslinking agents. These chemical gelling agents can appropriately control the melting point of the gel according to the present invention through control of the degree of crosslinking.

(Monomer or Oligomer)

Examples of the monomers having one polymerizable functional group per molecule include ethylene, propylene, butene, pentene, hexene, heptene, octene, nonene, decene, acrylic acid, styrene, p-acetoxystyrene, m-t-butoxystyrene, p-t-butoxystyrene, p-t-butylstyrene, p-cyanostyrene, 2,4-dimethylstyrene, 2,5-dimethylstyrene, p-methoxystyrene, p-methylstyrene, p-vinylphenol, 2-methoxy-4-vinylphenol, p-styrenesulfonic acid, 2,4,6-trimethyl styrene, p-vinylaniline, 2-vinylanthracene, 9-vinylanthracene, p-vinylbenzoic acid, 2-vinylnaphthalene, p-vinylphenylboronic acid, p-(t-butyldimethylsiloxy)styrene, 3,5-bis(trifluoromethyl)styrene, o-fluorostyrene, p-fluorostyrene, 1,1,1,3,3,3-hexafluoro-2-(4-vinylphenyl)-propane-2-ol, styrylethyltrimethoxysilane, m-(trifluoromethyl) styrene, 2,3,4,5,6-pentafluorostyrene, 2-phenoxyethyl methacrylate, octadecyl methacrylate, isodecyl acrylate, 2-n-butoxyethyl methacrylate, n-hexyl methacrylate, phenyl methacrylate, dodecyl acrylate, n-octyl methacrylate, n-propyl methacrylate, 2-ethoxyethyl methacrylate, n-hexyl acrylate, 2-(dimethylamino)ethyl acrylate, hexadecyl methacrylate, benzyl acrylate, β-carboxyethyl acrylate, hydroxypropyl methacrylate, iso-decyl methacrylate, butyl methacrylate, cyclohexyl acrylate, 2-(t-butylamino)ethyl methacrylate, triethyleneglycol monomethyl ether monomethacrylate, 2-naphthalene acrylate, glycerol monomethacrylate, 2-methoxyethyl methacrylate, 2-(2-ethoxyethoxy)ethyl acrylate, phenyl acrylate, n-propyl acrylate, butyl methacrylate, isobutyl methacrylate, isobutyl acrylate, butyl acrylate, benzyl methacrylate, t-butyl methacrylate, cyclohexyl methacrylate, t-butyl acrylate, 2-diethylaminoethyl methacrylate, ethyl acrylate, 2-ethylhexyl methacrylate, 2-ethylhexyl acrylate, ethyl methacrylate, dodecyl methacrylate, 2-(dimethylamino)ethyl methacrylate, methyl methacrylate, 2-hydroxyethyl methacrylate, 2-hydroxyethyl acrylate, 2-methoxyethyl acrylate, methacrylic acid, methyl acrylate, stearyl acrylate, tridecyl methacrylate, 2-hydroxypropyl methacrylate, hydroxypropyl acrylate and stearyl methacrylate.

Examples of the monomers having two or more polymerizable functional groups per molecule include bifunctional acrylates or methacrylates such as ethyleneglycol diacrylate, ethyleneglycol dimethacrylate, diethyleneglycol dimethacrylate, diethyleneglycol diacrylate, triethyleneglycol diacrylate, triethyleneglycol dimethacrylate, tetraethyleneglycol diacrylate, tetraethyleneglycol dimethacrylate, propylene diacrylate, propylene dimethacrylate, dipropylene diacrylate, dipropylene dimethacrylate, tripropylene diacrylate, tripropylene dimethacrylate, 1,3-butanediol diacrylate, 1,3-butanediol dimethacrylate, 1,4-butanediol diacrylate 1,4-butanediol dimethacrylate, 1,6-hexanediol diacrylate, 1,6-hexanediol dimethacrylate, polyethyleneglycol diacrylate, polyethyleneglycol dimethacrylate, polypropyleneglycol diacrylate, polypropyleneglycol dimethacrylate, polytetramethyleneglycol diacrylate and polytetramethyleneglycol dimethacrylate;

trifunctional acrylates or methacrylates such as trimethylolpropane triacrylate, trimethylolpropane trimethacrylate, pentaerythritol triacrylate and pentaerythritol trimethacrylate; and tetrafunctional acrylates or methacrylates such as ditrimethylolpropane tetraacrylate, ditrimethylolpropane tetramethacrylate and pentaerythritol tetraacrylate, pentaerythritol tetramethacrylate.

Besides these, examples thereof include monomers such as urethane methacrylate, copolymer oligomers thereof, and copolymer oligomers thereof with acrylonitrile. These are only part of the exemplary monomers and oligomers, and any other monomers or oligomers having one or more polymerizable functional groups can be used without limitation.

The degree of crosslinking of the gel skeleton can be controlled through adjustment of the mixing ratio of a monofunctional acrylate or methacrylate to a bi- or higher functional acrylate or methacrylate. A bi- or higher functional acrylate or methacrylate without any monofunctional acrylate or methacrylate may be used, or a combination of bi- or higher functional acrylates and/or methacrylates can be used.

The monomer or the oligomer for the gelling agent preferably has a polar group such as a hydroxyl group, a carboxyl group, an ether group, a sulfo group, or an amino group in the molecule to enhance the miscibility with the organic solvent. Preferably, the number of polar groups is appropriately varied according to the organic solvent or the electrolyte solution used.

The monomer or the oligomer for the gelling agent modified with polyether is particularly preferred because such a monomer or oligomer enhances compatibility between the oxide film, the conductive polymer, and the organic solvent or the electrolyte solution to attain a sufficient effect sought in the present invention.

The polar group in the molecule of the monomer or the oligomer for the gelling agent enhances the bonding force between the molecular skeleton formed of the monomer or the oligomer, the organic solvent, and the electrolyte solution, resulting in the gel and the gel electrolyte having an integrated structure. The gel electrolyte having an integrated structure can prevent rapid feed of ions of the electrolyte from the gel electrolyte during repair of the oxide film, and can enhance only the ability to repair the oxide film without damaging the oxide film even in a high ion concentration in the gel electrolyte.

(Polymerization Initiator)

Any polymerization initiator which can crosslink the monomer or the oligomer for the gelling agent through polymerization to form a desired gel or gel electrolyte can be used without limitation. Examples thereof include:

Azo compounds such as 2,2'-azobis(4-methoxy-2,4-dimethylvaleronitrile), 2,2'-azobis(2,4-dimethylvaleronitrile), 2,2'-azobis(isobutyronitrile), 2,2'-azobis(2-methylbutyronitrile), 1,1'-azobis(cyclohexane-1-carbonitrile), 1-[(1-cyano-1-methylethyl)azo]formamide, 2,2'-azobis[2-(2-imidazolin-2-yl)propane]dihydrochloride, 2,2'-azobis[2-(2-imidazolin-2-yl)propane]disulfate dihydrate, 2,2'-azobis[2-(2-imidazolin-2-yl)propane], 2,2'-azobis(2-amidinopropane) dihydrochloride, 2,2'-azobis[N-(2-carboxyethyl)-methylpropionamidine]n-hydrate, 2,2'-azobis[2-methyl-N-(2-hydroxyethyl)propionamide], 2,2'-azobis[N-(2-propyl)-2-methyl-propionamide], 2,2'-azobis[N-butyl-2-methyl-propionamide], dimethyl 2,2'-azobis(isobutyrate) and 4,4'-azobis(4-cyano pentanoic acid); and organic peroxides such as bis-3,5,5-trimethylhexanoyl peroxide, dilauroyl peroxide, dibenzoyl peroxide, 1,1,3,3-tetramethylbutyl hydroperoxide, cumene hydroperoxide, t-butyl hydroperoxide, dicumyl peroxide, 2,5-dimethyl-2,5-di(t-butylperoxyisopropyl) benzene, t-butylcumyl peroxide, di-t-butylcumyl peroxide, 2,5-dimethyl-2, 5-di(t-butylperoxy)hexyne, 2,2-bis(4,4-di-t-butylperoxycyclohexyl)propane, 1,1-di-t-butylperoxycyclohexane, 2,2-di-t-butylperoxy butane, 1,1,3,3-tetramethylbutylperoxy neodecanoate, α-cumylperoxy neodecanoate, t-butylperoxy neodecanoate, t-butylperoxy neohexanoate, t-butylperoxy pivalate, 1,1,3, 3-tetramethylbutylperoxy-2-ethylhexanoate, t-amylperoxy-2-ethylhexanoate, t-butylperoxy-2-ethylhexanoate, di-t-butylperoxy hexahydroterephthalate, t-amylperoxy-3,5,5-trimethylhexanoate, t-butylperoxy-3,5,5-trimethylhexanoate, t-butylperoxyacetate, t-butylperoxybenzoate, di-2-ethylhexylperoxy dicarbonate, diisopropylperoxy dicarbonate, t-butylperoxy isopropyl carbonate, t-butylperoxy-2-ethylhexyl carbonate and 1,6-bis(t-butylperoxycarbonyloxy)hexane.

The azo compounds generate nitrogen gas during the polymerization reaction. Accordingly, preferred polymerization initiators are organic peroxides.

An acid can also be used as the polymerization initiator. Use of an acid progresses the gelation reaction more slowly than use of the azo compound or the organic peroxide without damaging the conductive polymer. For this reason, an increase in ESR of the solid electrolytic capacitor can be prevented without damaging the conductivity of the conductive polymer. Particularly preferred is use of a weak acid such as carboxylic acid, phosphoric acid, phosphorous acid, or phenol because the reaction progresses more significantly slowly.

In the monomer or the oligomer for the gelling agent also having an ether chain, the ether chain may be decomposed through cleavage by use of a strong acid. From this viewpoint, use of a weak acid is also preferred.

(Polymer Having Two or More Functional Groups Serving as Staring Points of Crosslinking)

Examples of the polymers having two or more functional groups serving as staring points of crosslinking include poly(vinyl alcohol), poly(acrylic acid), poly(styrenesulfonic acid), polyester sulfonic acid, carboxymethyl cellulose, methyl cellulose, hydroxypropyl cellulose, hydroxypropylmethyl cellulose, and polyacrylamide. The polymers may be copolymerization polymers of polyvinyls, polyesters, polyamides, polyimides, and polyamideimides with poly(vinyl alcohol), poly(acrylic acid), poly(styrenesulfonic acid), polyester sulfonic acid, carboxymethyl cellulose, methyl cellulose, hydroxypropyl cellulose, hydroxypropylmethyl cellulose, and polyacrylamide. The polymers may have a structure composed of a polymer main chain of polyvinyl, polyester, polyamide, polyimide, or polyamideimide and two or more functional groups serving as starting points of crosslinking added to the polymer main chain.

Preferred functional groups serving as starting points of crosslinking are polar groups such as a hydroxyl group, a carboxyl group, a sulfo group, and an amino group. The polar group in the polymer above enhances the bonding force between the molecular skeleton formed of the polymer, the organic solvent, and the electrolyte solution, resulting in the gel and the gel electrolyte having an integrated structure. The gel electrolyte having an integrated structure can prevent rapid feed of ions of the electrolyte from the gel electrolyte during repair of the oxide film, and thus can enhance only the ability to repair the oxide film without damaging the oxide film even in a high ion concentration of the gel electrolyte.

(Crosslinking Agent)

Any crosslinking agent can be used as long as the crosslinking agent can react with the functional groups serving as starting points of crosslinking contained in the polymer to form a crosslinking structure. Examples thereof include: sorbitol polyglycidyl ether, polyglycerol polyglycidyl ether, pentaerythritol polyglycidyl ether, diglycerol polyglycidyl ether, glycerol polyglycidyl ether, trimethylolpropane polyglycidyl ether, resorcinol diglycidyl ether, neopentylglycol diglycidyl ether, 1,6-hexanediol diglycidyl ether, polyethyleneglycol diglycidyl ether, polypropyleneglycol diglycidyl ether, polybutadiene diglycidyl ether, diglycidyl o-phthalate, hydroquinone diglycidyl ether, diglycidyl terephthalate, dibromoneopentylglycol diglycidyl ether.

<Solid Electrolytic Capacitor>

Basically, the solid electrolytic capacitor according to the present embodiment has substantially the same configuration of the conventional solid electrolytic capacitor except that the solid electrolyte layer included in the solid electrolytic capacitor contains the conductive polymer and the gel of the organic solvent solidified with the chemical gelling agent or the gel electrolyte of the electrolyte solution composed of the organic solvent solidified with the chemical gelling agent. In other words, any solid electrolytic capacitor having any known shape and composed of any known material can be used without limitation.

In FIG. 1, a schematic sectional view of an example of the solid electrolytic capacitor according to the present embodiment is shown. In the solid electrolytic capacitor, dielectric oxide film layer 2, solid electrolyte layer 3, graphite layer 4, and silver layer 5 are sequentially formed on valve metal 1. Valve metal 1 has valve metal lead 8. Valve metal lead 8 is connected to one electrode 7 by welding. Silver layer 5 is connected to the other electrode 7 with conductive adhesive 6. The solid electrolytic capacitor is covered with exterior resin 9 in the state where two electrodes 7 are partially exposed to the outside. The solid electrolytic capacitor may have a substrate structure composed of a substrate having wiring rather than electrodes 7. Such a substrate structure may be formed as follows: A capacitor element including the components up to silver layer 5 is connected to the substrate with a conductive adhesive or by welding, and is covered with an exterior resin.

(Valve Metal)

Valve metal 1 is formed of a valve metal plate, foil, or line; a sintered body including valve metal nanoparticles; or a porous metal having an increased surface area by etching, for example. A preferred valve metal is at least one selected from aluminum, tantalum, niobium, tungsten, titanium, and zirconium, or an alloy of these metals.

(Dielectric Oxide Film Layer)

Dielectric oxide film layer 2 can be formed through electrolytic oxidation of the surface of valve metal 1. If valve metal 1 is a sintered body or a porous metal, dielectric oxide film layer 2 is also formed in pores in the sintered body or the porous metal. The thickness of dielectric oxide film layer 2 can be appropriately adjusted according to the voltage during electrolytic oxidation.

(Solid Electrolyte Layer)

Solid electrolyte layer 3 includes a conductive polymer and a gel of an organic solvent solidified with a chemical gelling agent or a gel electrolyte of an electrolyte solution composed of an organic solvent containing an electrolyte, the electrolyte solution being solidified with a chemical gelling agent. The conductive polymer can have a single layer structure or a multi-layer structure. In an exemplary method of forming solid electrolyte layer 3, chemical oxidation polymerization of a monomer that can provide the conductive polymer is performed several times to prepare a conductive polymer layer on dielectric oxide film layer 2; and the conductive polymer layer is then impregnated with an organic solvent containing a chemical gelling agent or an electrolyte solution containing a chemical gelling agent, and thereafter, gelation is performed. Gelation can be performed by heating. Through these steps, solid electrolyte layer 3 has a structure containing both the conductive polymer and the gel or the gel electrolyte. The conductive polymer layer obtained through chemical oxidation polymerization has a structure having pores inside thereof as a sponge. After formation of the conductive polymer layer, the conductive polymer layer having such a porous structure can be impregnated with an organic solvent or an electrolyte solution before gelation to readily spread the organic solvent or the electrolyte solution across the conductive polymer layer near the oxide film.

The solid electrolyte layer may also be formed as follows: After formation of the conductive polymer layer, the graphite layer and the silver layer are further formed. The conductive polymer layer is then impregnated with an organic solvent containing a chemical gelling agent or electrolyte solution containing a chemical gelling agent before gelation, and thereafter, gelation is performed to form a solid electrolyte layer.

As another example of the method of forming solid electrolyte layer 3, a conductive polymer solution containing a conductive polymer, a chemical gelling agent, and an organic solvent or an electrolyte solution composed of an organic solvent containing an electrolyte is subjected to gelation to form a solid electrolyte layer containing both the conductive polymer and the gel of the organic solvent solidified or the gel electrolyte of the electrolyte solution solidified. Gelation can be performed by heating. The conductive polymer solution according to the present invention may be in the form of a solution or a dispersion liquid. Although water entrained during preparation of the conductive polymer may be contained in the conductive polymer solution, the water is preferably removed as much as possible during gelation.

The method of forming solid electrolyte layer 3 may be performed using a conductive polymer aqueous solution containing a conductive polymer as follows: Water is removed from the conductive polymer aqueous solution to form a conductive polymer layer. The conductive polymer layer is then impregnated with an organic solvent containing a chemical gelling agent or an electrolyte solution containing a chemical gelling agent before gelation, and thereafter, gelation is performed.

On solid electrolyte layer 3 containing both the conductive polymer and the gel or the gel electrolyte, another conductive polymer layer not containing the gel or the gel electrolyte may be formed by chemical oxidation polymerization of a monomer to prepare a conductive polymer, electrolysis polymerization, or a method of applying or impregnating the conductive polymer solution onto or into solid electrolyte layer 3, and then removing the solvent. The gel or the gel electrolyte may be present near the oxide film to repair the oxide film, and the effect can be sufficiently attained even if the gel or the gel electrolyte is not present across the solid electrolyte layer.

The monomer usable in preparation of a conductive polymer can be at least one selected from the group consisting of pyrrole, thiophene, aniline, and derivatives thereof. Preferred dopants used in preparation of the monomer into a conductive polymer through chemical oxidation polymerization or electrolysis polymerization are sulfonic acid compounds such as benzenesulfonic acid, naphthalenesulfonic acid, phenolsulfonic acid, styrenesulfonic acid, and derivatives thereof. The dopant can have any molecular weight, and the molecular weight can be appropriately selected. Usable solvents are water and mixed solvents containing water and water-soluble organic solvents.

Application or impregnation of the conductive polymer solution can be performed by any method. Preferably, the conductive polymer solution is left for several minutes to several tens of minutes to sufficiently fill the conductive polymer solution into pores of the porous component after application or impregnation thereof. Repeated immersion of the conductive polymer solution or immersion under reduced or increased pressure is preferred.

The solvent can be removed from the conductive polymer solution by drying. Drying can be performed at any drying temperature at which the target solvent can be removed. A preferred drying temperature is less than the melting point of the gel to reduce the amount of the solvent to volatilize from the gel. Although the drying time is appropriately selected according to the drying temperature, drying can be performed for any drying time as long as the conductivity of the conductive polymer is not impaired and the gel is not damaged.

(Graphite Layer)

Graphite layer 4 can be formed using a graphite paste prepared by dispersing graphite powder and a binder in a predetermined solvent (diluent). The particle size and the amount of graphite can be appropriately controlled so as to appropriately attain a desired conductivity.

Commercially available products can be used as the graphite paste. A conductive layer containing a carbon material such as carbon black may be formed rather than the graphite layer.

Examples of the method of forming graphite layer 4 include a method of applying or impregnating the graphite paste onto or into conductive polymer layer 3, and removing the solvent. The solvent can be removed from the graphite paste by drying. Drying can be performed at any drying temperature at which the solvent can be removed. A preferred drying temperature is less than the melting point of the gel to reduce the amount of the solvent to volatilize from the gel and the gel electrolyte. Although the drying time is appropriately selected according to the drying temperature, drying can be performed for any drying time as long as the conductivity of the conductive polymer is not impaired and the gel and the gel electrolyte are not damaged.

(Silver Layer)

Silver layer 5 can be formed using a silver paste prepared by dispersing silver nanoparticles and a binder in a predetermined solvent (diluent). The particle size and the amount of the silver nanoparticles can be appropriately controlled so as to appropriately attain a desired conductivity. As the silver paste, commercially available products are also readily available.

Examples of the method of forming silver layer 5 include a method of applying or impregnating the silver paste onto or into graphite layer 4, and removing the solvent. The solvent can be removed from the silver paste by drying. Drying can be performed at any drying temperature at which the solvent can be removed. A preferred drying temperature is less than the melting point of the gel to reduce the amount of the solvent to volatilize from the gel and the gel electrolyte. Although the drying time is appropriately selected according to the drying temperature, drying can be performed for any drying time as long as the conductivity of the conductive polymer is not impaired and the gel and the gel electrolyte are not damaged.

(Electrode)

Electrode 7 is connected by welding or through conductive adhesive 6. Examples of the method of forming conductive adhesive 6 include a method of applying a known conductive adhesive paste onto silver layer 5, laminating electrode 7 on the adhesive paste, and removing the solvent. The solvent can be removed from the conductive adhesive paste by drying. Drying can be performed at any drying temperature at which the solvent can be removed. A preferred drying temperature is less than the melting point of the gel to reduce the amount of the solvent to volatilize from the gel and the gel electrolyte. Although the drying time is appropriately selected according to the drying temperature, drying can be performed for any drying time as long as the conductivity of the conductive polymer is not impaired and the gel and the gel electrolyte are not damaged.

(Exterior Resin)

Any resin can be used as exterior resin 9. Usually, thermosetting epoxy resins are used. The capacitor element is temporarily exposed to heat at about 180° C. during transfer molding of the resin.

As described above, a variety of heat treatments are involved in the production process of the solid electrolytic capacitor. Accordingly, the gelation step may be performed during or immediately after formation of conductive polymer layer 3, during or after formation of graphite layer 4, during or after formation of silver layer 5, during drying or after formation of conductive adhesive 6, or during molding or after formation of exterior resin.

The gelation step is particularly preferably performed during formation of graphite layer 4 or later because the gel skeleton having a low conductivity does not obstruct the conductive path between the conductive polymer layer and the graphite layer to prevent an increase in ESR of the solid electrolytic capacitor.

EXAMPLES

Hereinafter, the present invention will be specifically described by way of Examples, but the present invention will not be limited to only these Examples.

Example 1

In this Example, a solid electrolytic capacitor shown in FIG. 1 was produced by the following method.

A sintered body of tantalum nanoparticles as valve metal 1 was subjected to electrolytic oxidation at 10 V in an aqueous solution of phosphoric acid to prepare a pellet composed of the sintered body of tantalum nanoparticles having the entire surface coated with dielectric oxide film layer 2.

Next, the pellet coated with the dielectric oxide film layer was immersed in a methanol solution of 30% by mass of ferric p-toluenesulfonate serving as an oxidizing agent and a dopant for 10 minutes, and was dried at room temperature for 30 minutes. The resultant was then immersed for 10 minutes in 3,4-ethylenedioxythiophene that is a thiophene derivative as a monomer used to prepare a conductive polymer, and was kept at room temperature for 30 minutes to perform polymerization of 3,4-ethylenedioxythiophene. In the next step, the product was immersed in ethanol to clean the non-reacted product and residues of the oxidizing agent. The series of polymerization operation of filling of the oxidizing agent, filling of 3,4-ethylenedioxythiophene, and cleaning was repeated five times to prepare a capacitor element including a conductive polymer layer composed of a polyethylenedioxythiophene layer.

The capacitor element including the conductive polymer layer was immersed for 10 minutes in glycerol containing a chemical gelling agent and heated to 70° C. to impregnate the glycerol into the conductive polymer layer so that the glycerol came near the dielectric oxide film layer. The glycerol containing the chemical gelling agent was diluted with isopropyl alcohol (50% by mass of glycerol containing the chemical gelling agent) for use to enhance permeation of glycerol into the conductive polymer layer. In the chemical gelling agent at this time, acrylic acid was used as a monomer having one polymerizable functional group per molecule, pentaerythritol triacrylate was used as a monomer having two or more polymerizable functional groups per molecule, and benzoyl peroxide was used as a polymerization initiator. The chemical gelling agent was prepared by adding 10 parts by mass of acrylic acid and 5 parts by mass of pentaerythritol triacrylate relative to 100 parts by mass of glycerol. After impregnation, the capacitor element was heated at 110° C. for one hour to remove isopropyl alcohol and perform gelation of glycerol. Through this step, solid electrolyte layer 3 containing both the conductive polymer and the gel containing glycerol was prepared. The gel prepared on this condition had a melting point of 271° C.

After formation of solid electrolyte layer 3, the pellet was immersed in a graphite paste, and was extracted. The pellet was then dried at 120° C. for one hour to form graphite layer 4. After formation of graphite layer 4, the pellet was immersed in the silver paste, and was extracted. The pellet was then dried at 120° C. for one hour to form silver layer 5. In the subsequent step, conductive adhesive 6, external electrode 7, and exterior resin 9 were sequentially formed to produce a solid electrolytic capacitor.

The resulting solid electrolytic capacitor was mounted on a substrate for evaluation by a reflow soldering process, and LC was then evaluated. LC was evaluated twice, after mounting and after a heat-resistant test was performed at 150° C. for 500 hours. The results are shown in Table 1. The rate of defects due to expansion of the exterior during production and mounting of the solid electrolytic capacitor is also shown in Table 1.

Example 2

A solid electrolytic capacitor was produced in the same manner as in Example 1 except that the organic solvent used was γ-butyrolactone rather than glycerol. Evaluation was performed in the same manner as in Example 1. The results are shown in Table 1.

Example 3

A solid electrolytic capacitor was produced in the same manner as in Example 1 except that the organic solvent used was ethylene glycol monoethyl ether rather than glycerol. Evaluation was performed in the same manner as in Example 1. The results are shown in Table 1.

Example 4

A solid electrolytic capacitor was produced in the same manner as in Example 1 except that in the chemical gelling agent, the amount of acrylic acid was changed to 10 parts by mass and the amount of pentaerythritol triacrylate was changed to 1 part by mass relative to 100 parts by mass of glycerol. Evaluation was performed in the same manner as in Example 1. The results are shown in Table 1.

Example 5

A solid electrolytic capacitor was produced in the same manner as in Example 1 except that in the chemical gelling agent, the amount of acrylic acid was changed to 10 parts by mass and the amount of pentaerythritol triacrylate was changed to 0.4 parts by mass relative to 100 parts by mass of glycerol. Evaluation was performed in the same manner as in Example 1. The results are shown in Table 1.

Example 6

A solid electrolytic capacitor was produced in the same manner as in Example 1 except that the chemical gelling agent was replaced by polyethylene glycol diacrylate (trade name "FANCRYL FA-240A," manufactured by Hitachi Chemical Co., Ltd., hereinafter referred to as "FA240A") and EO-modified trimethylolpropane triacrylate (trade name "FANCRYL FA-137A," manufactured by Hitachi Chemical Co., Ltd., hereinafter referred to as "FA137A"). In this chemical gelling agent, the amount of FA240A was 7 parts by mass and the amount of FA137A was 2 parts by mass relative to 100 parts by mass of glycerol. FA240A has two polymerizable functional groups (acryloyl groups) per molecule and has a polyether chain in the molecule. FA137A has three polymerizable functional groups (acryloyl groups) per molecule and has a polyether chain in the molecule.

The resulting solid electrolytic capacitor was evaluated in the same manner as in Example 1. The results are shown in Table 1.

Example 7

To 100 parts by mass of glycerol, 0.3 parts by mass of phosphoric acid, 10 parts by mass of boric acid, and 1 part by mass of ammonia was added, and the solution was heated at 150° C. for 30 minutes to prepare an electrolyte solution containing glycerol. A solid electrolytic capacitor was produced in the same manner as in Example 1 except that in the chemical gelling agent, 10 parts by mass of acrylic acid and 5 parts by mass of pentaerythritol triacrylate were added to 100 parts by mass of the electrolyte solution. Evaluation was performed in the same manner as in Example 1. The results are shown in Table 1.

Example 8

A solid electrolytic capacitor was produced in the same manner as in Example 7 except that glycerol was replaced by ethylene glycol. Evaluation was performed in the same manner as in Example 1. The results are shown in Table 1.

Example 9

A solid electrolytic capacitor was produced in the same manner as in Example 7 except that glycerol was replaced by γ-butyrolactone. Evaluation was performed in the same manner as in Example 1. The results are shown in Table 1.

Example 10

A solid electrolytic capacitor was produced in the same manner as in Example 7 except that in the chemical gelling agent, 10 parts by mass of acrylic acid and 1 part by mass of pentaerythritol triacrylate were added to 100 parts by mass of the electrolyte solution. Evaluation was performed in the same manner as in Example 1. The results are shown in Table 1.

Example 11

A solid electrolytic capacitor was produced in the same manner as in Example 7 except that in the chemical gelling agent, 10 parts by mass of acrylic acid and 0.4 parts by mass of pentaerythritol triacrylate were added to 100 parts by mass of the electrolyte solution. Evaluation was performed in the same manner as in Example 1. The results are shown in Table 1.

Example 12

A solid electrolytic capacitor was produced in the same manner as in Example 7 except that 10 parts by mass of phthalic acid and 1 part by mass of ammonia were added to 100 parts by mass of glycerol to prepare an electrolyte solution. Evaluation was performed in the same manner as in Example 1. The results are shown in Table 1.

Example 13

A polymer having two or more functional groups serving as staring points of crosslinking, hydroxypropylmethyl cellulose (trade name "METOLOSE 60SH-03," manufactured by Shin-Etsu Chemical Co., Ltd.) was used as the chemical gelling agent, and polyglycerol polyglycidyl ether (trade name "SR-4 GL," manufactured by SAKAMOTO YAKUHIN KOGYO CO., LTD.) was used as the crosslinking agent. In the chemical gelling agent, 10 parts by mass of hydroxypropyl cellulose and 4 parts by mass of polyglycerol polyglycidyl ether were added to 100 parts by mass of glycerol. Except for these, a solid electrolytic capacitor was produced in the same manner as in Example 7. Evaluation was performed in the same manner as in Example 1. The results are shown in Table 1.

Example 14

A solid electrolytic capacitor was produced in the same manner as in Example 7 except that FA240A and FA137A were used as the chemical gelling agent and benzoic acid as an acid was used as the polymerization initiator. In the chemical gelling agent, the amount of FA240A was 7 parts by mass and the amount of FA137A was 2 parts by mass relative to 100 parts by mass of glycerol.

The resulting solid electrolytic capacitor was evaluated in the same manner as in Example 1. The results are shown in Table 1.

Example 15

A solid electrolytic capacitor was produced in the same manner as in Example 7 except that glycerol was replaced by diglycerol, "FANCRYL FA-220A" (trade name, manufactured by Hitachi Chemical Co., Ltd., hereinafter referred to as "FA220A") and FA137A were used as the chemical gelling agent, and benzoic acid as an acid was used as the polymerization initiator. In the chemical gelling agent, the amount of FA220A was 10 parts by mass and the amount of FA137A was 3 parts by mass relative to 100 parts by mass of diglycerol.

The resulting solid electrolytic capacitor was evaluated in the same manner as in Example 1. The results are shown in Table 1.

Example 16

A solid electrolytic capacitor was produced in the same manner as in Example 7 except that an etched aluminum foil was used as the valve metal. Evaluation was performed in the same manner as in Example 1. The results are shown in Table 1.

Example 17

A solid electrolytic capacitor was produced in the same manner as in Example 7 except that a sintered body of nanoparticles composed of an alloy of titanium and zirconium was used as the valve metal. The alloy used in this case contained titanium and zirconium in an atomic ratio of 1:1. Evaluation was performed in the same manner as in Example 1. The results are shown in Table 1.

Example 18

A solid electrolytic capacitor was produced in the same manner as in Example 7 except that the solid electrolyte layer was formed using a conductive polymer solution containing a conductive polymer, a chemical gelling agent, and an electrolyte solution composed of an organic solvent.

The method of forming the solid electrolyte layer will be described in detail. The conductive polymer solution contains a conductive polymer composed of polydioxythiophene and polystyrenesulfonic acid; an electrolyte solution prepared by adding 0.3 parts by mass of phosphoric acid, 10 parts by mass of boric acid, and 1 part by mass of ammonia to 100 parts by mass of glycerol; and a chemical gelling agent in combination of acrylic acid, pentaerythritol triacrylate, and benzoyl peroxide as a polymerization initiator. In 100 parts by mass of the conductive polymer solution, 4 parts by mass of a conductive polymer, 10 parts by mass of an electrolyte solution composed of glycerol, 1 part by mass of acrylic acid, and 0.5 parts by mass of pentaerythritol triacrylate are included. The pellet coated with dielectric oxide film layer 2 was immersed in the conductive polymer solution for five minutes. Water contained in the solution was then removed and the electrolyte solution was gelled at 130° C. The step was repeated eight times to form a solid electrolyte containing both the conductive polymer and the gel electrolyte.

Evaluation was performed in the same manner as in Example 1. The results are shown in Table 1.

Comparative Example 1

A solid electrolytic capacitor was produced in the same manner as in Example 1 except that glycerol containing no chemical gelling agent was used. Evaluation was performed in the same manner as in Example 1. The results are shown in Table 1.

Comparative Example 2

A solid electrolytic capacitor was produced in the same manner as in Example 7 except that the chemical gelling agent was not used.

Evaluation was performed in the same manner as in Example 1. The results are shown in Table 1.

Comparative Example 3

A solid electrolytic capacitor was produced in the same manner as in Example 1 except that glycerol containing the chemical gelling agent was not impregnated and not subjected to gelation. Evaluation was performed in the same manner as in Example 1. The results are shown in Table 1.

The melting points of gel in the Examples, the LCs in the Examples and the Comparative Examples, and the proportion defective due to expansion of the exterior were determined by the following methods.

Melting point of gel: the melting point of the gel was determined by differential scanning calorimetry (DSC6220 manufactured by SII NanoTechnology Inc.) using the gels or the gel electrolyte solutions prepared through gelation of the organic solvents containing a gelling agent or electrolyte solutions containing a gelling agent in the Examples on the corresponding heat treatment conditions for the solid electrolytic capacitors. In the gel prepared with the conductive polymer solution containing a conductive polymer, a gelling agent, and an organic solvent or an electrolyte solution, the gel containing the conductive polymer was measured.

LC: in accordance with JIS C5101-1, the leakage current (LC) of the solid electrolytic capacitor was measured at a temperature of 25° C. after mounting without aging, and then was measured after the capacitor was kept at 150° C. under a rating voltage for 500 hours, and was cooled to 25° C. In each measurement, the leaked current (μA) was measured twice five minutes after the capacitance reached the specified capacitance (C) and the voltage reached the rating voltage (V). The average is shown.

Proportion defective due to expansion of exterior: in each Example, 100 samples were prepared, and expansion of the exteriors during formation of the exterior resin and mounting were visually observed to calculate the proportion defective.

TABLE 1

| | Melting point of gel (° C.) | LC (μA/CV) | | Proportion defective due to expansion of exterior (%) | |
|---|---|---|---|---|---|
| | | After mounting | After 500 hours at 150° C. | During formation of exterior resin | During mounting |
| Example 1 | 271 | 0.05 | 0.07 | 0 | 0 |
| Example 2 | 262 | 0.05 | 0.07 | 0 | 0 |
| Example 3 | 248 | 0.05 | 0.08 | 0 | 0 |
| Example 4 | 186 | 0.06 | 0.1 | 1 | 4 |
| Example 5 | 164 | 0.06 | 0.2 | 3 | 11 |
| Example 6 | 330 | 0.05 | 0.07 | 0 | 0 |
| Example 7 | 280 | 0.04 | 0.06 | 0 | 0 |
| Example 8 | 220 | 0.03 | 0.07 | 1 | 2 |
| Example 9 | 267 | 0.03 | 0.06 | 0 | 0 |
| Example 10 | 182 | 0.04 | 0.08 | 0 | 3 |
| Example 11 | 161 | 0.04 | 0.09 | 2 | 9 |
| Example 12 | 277 | 0.04 | 0.06 | 0 | 0 |
| Example 13 | 262 | 0.06 | 0.09 | 0 | 0 |
| Example 14 | 330 | 0.03 | 0.05 | 0 | 0 |
| Example 15 | 355 | 0.03 | 0.04 | 0 | 0 |
| Example 16 | 278 | 0.04 | 0.06 | 0 | 0 |
| Example 17 | 278 | 0.04 | 0.07 | 0 | 0 |
| Example 18 | 280 | 0.03 | 0.05 | 0 | 0 |
| Comparative Example 1 | — | 0.05 | 0.6 | 21 | 27 |
| Comparative Example 2 | — | 0.2 | 1 | 18 | 30 |
| Comparative Example 3 | — | 0.09 | 0.7 | 0 | 0 |

Example 19

A solid electrolytic capacitor was produced in the same manner as in Example 7 except that gelation was performed during formation of the graphite layer.

A capacitor element including a conductive polymer layer was immersed in the electrolyte solution prepared in Example 7 containing the following chemical gelling agent for 10 minutes to impregnate the electrolyte solution into the conductive polymer layer so that the electrolyte solution came near the dielectric oxide film layer. The electrolyte solution was diluted with isopropyl alcohol (50% by mass of electrolyte solution) for use to enhance the permeation of the electrolyte solution into the conductive polymer layer. In the chemical gelling agent, acrylic acid was used as a monomer having one polymerizable functional group per molecule, pentaerythritol triacrylate was used as a monomer having two or more polymerizable functional groups per molecule, and benzoyl peroxide was used as the polymerization initiator. In the chemical gelling agent, 10 parts by mass of acrylic acid and 5 parts by mass of pentaerythritol triacrylate were added to 100 parts by mass of glycerol. After impregnation, the capacitor element was heated at 60° C. for one hour to remove isopropyl alcohol.

After impregnation of the electrolyte solution, the pellet was immersed in a graphite paste, and was extracted. The pellet was then dried at 120° C. for one hour to perform gelation of the electrolyte solution to form graphite layer 4. Through this step, solid electrolyte layer 3 containing both the conductive polymer and the gel electrolyte containing glycerol was prepared. The gel electrolyte prepared on this condition had a melting point of 280° C. After formation of graphite layer 4, the pellet was immersed in a silver paste, and was extracted. The pellet was then dried at 120° C. for one hour to form silver layer 5. In the subsequent step, conductive adhesive 6, external electrode 7, and exterior resin 9 were sequentially formed to produce a solid electrolytic capacitor.

The ESR of the prepared solid electrolytic capacitor was measured with an LCR meter. Specifically, ESR was measured at a frequency of 100 kHz and a DC bias of 1.5 V through superimposition of a sine wave having an effective value of 0.5 V. The results of ESR in Examples 7 and 19 and Comparative Example 3 are shown in Table 2.

TABLE 2

| | ESR (mΩ) |
|---|---|
| Example 7 | 12 |
| Example 19 | 8 |
| Comparative Example 3 | 8 |

What is claimed is:

1. A solid electrolytic capacitor comprising a valve metal, an oxide film layer formed on a surface of the valve metal, and a solid electrolyte layer formed on the oxide film layer,
    wherein the solid electrolyte layer comprises a conductive polymer and a gel of an organic solvent solidified with a chemical gelling agent,
    the chemical gelling agent is selected from combinations of monomers or oligomers having one or more polymerizable functional groups per molecule and polymerization initiators, and combinations of polymers having two or more functional groups serving as staring points of crosslinking and crosslinking agents, and
    the gel has a melting point of 160° C. or more.

2. The solid electrolytic capacitor according to claim 1, wherein the gel has a melting point of 180° C. or more.

3. The solid electrolytic capacitor according to claim 2, wherein the gel has a melting point of 260° C. or more.

4. The solid electrolytic capacitor according to claim 1, wherein the solid electrolyte layer is a solid electrolyte layer formed by forming a conductive polymer layer on the oxide film layer, and then impregnating the conductive polymer layer with the organic solvent containing the chemical gelling agent to gel the organic solvent.

5. The solid electrolytic capacitor according to claim 1, wherein the solid electrolyte layer is a solid electrolyte layer formed by gelling a conductive polymer solution containing the conductive polymer, the chemical gelling agent, and the organic solvent.

6. The solid electrolytic capacitor according to claim 1, wherein the gel comprises a gel electrolyte formed by solidifying an electrolyte solution containing the organic solvent and an electrolyte.

7. The solid electrolytic capacitor according to claim 6, wherein the solid electrolyte layer is a solid electrolyte layer formed by forming a conductive polymer layer on the oxide film layer, and then impregnating the conductive polymer layer with the electrolyte solution containing the chemical gelling agent to gel the electrolyte solution.

8. The solid electrolytic capacitor according to claim 6, wherein the solid electrolyte layer is a solid electrolyte layer formed by gelling a conductive polymer solution containing the conductive polymer, the chemical gelling agent, the organic solvent, and an electrolyte.

9. The solid electrolytic capacitor according to claim 1, wherein the valve metal is at least one selected from aluminum, tantalum, niobium, tungsten, titanium, and zirconium or at least one selected from alloys of the valve metals.

\* \* \* \* \*